United States Patent [19]
Takaoka et al.

[11] 3,909,177
[45] Sept. 30, 1975

[54] APPARATUS FOR MANUFACTURING POLYOLEFIN-INSULATED CABLES

[75] Inventors: Michio Takaoka; Hiroto Oshima; Toshiharu Katsuhara; Motoyuki Ono; Hideo Sano, all of Suzuka; Masaichiro Seki; Masakazu Hasegawa, both of Tokyo, all of Japan

[73] Assignee: The Fujikura Cable Works, Ltd., Tokyo, Japan

[22] Filed: Aug. 29, 1974

[21] Appl. No.: 501,834

[30] Foreign Application Priority Data
Aug. 30, 1973  Japan.................. 48-97726

[52] U.S. Cl. ............ 425/384; 264/28; 264/236; 264/347; 425/113; 425/378 R
[51] Int. Cl.² ......................... B29H 5/28
[58] Field of Search.... 425/107, 113, 378 R, 379 R, 425/384; 264/28, 236, 347

[56] References Cited
UNITED STATES PATENTS

| | | | |
|---|---|---|---|
| 2,069,087 | 1/1937 | Forstrom et al. ........... | 425/384 X |
| 2,540,497 | 2/1951 | Stiegler ...................... | 425/384 X |
| 2,561,820 | 7/1951 | Ramsey et al. ............. | 264/347 |
| 2,581,230 | 1/1952 | Berggren .................... | 264/347 |
| 3,513,228 | 5/1970 | Miyauchi et al. ........... | 425/113 X |
| 3,635,621 | 1/1972 | Miyauchi et al. ........... | 425/113 |
| 3,645,656 | 2/1972 | Stauffer et al. ............. | 425/113 X |
| 3,659,987 | 5/1972 | Mixell et al. ................ | 425/378 X |
| 3,859,247 | 1/1975 | MacKenzie, Jr. ........... | 264/236 X |

OTHER PUBLICATIONS

"Whittington's Dictionary of Plastics," by Lloyd R. Whittington, Technomic Publishing Company, Preface & pp. 59, 60.

Primary Examiner—Ronald J. Shore
Attorney, Agent, or Firm—Toren, McGeady and Stanger

[57] ABSTRACT

An apparatus for manufacturing hardened polyolefin-insulated cables comprising a hardenable polyolefin-extruding device, a tube partitioned into heating and cooling zones by way of a certain partition area, for example, an area composed of a seal packing, the two zones being filed with circulating silicone oil and constituted of different circulating systems, through which the polyolefin-covered cable core is drawn, and a die provided at the other end of the curing tube and connected to a super-cooling device, where the pressurized oil is super-cooled to increase its density to such extent that the clearance between the outer surface of the cable core and the inner wall surface of the passage in the die is sealed.

4 Claims, 2 Drawing Figures

３,909,177

APPARATUS FOR MANUFACTURING POLYOLEFIN-INSULATED CABLES

FIELD OF THE INVENTION

This invention relates to an apparatus for manufacturing electrical conducting cables covered with a hardened polyolefin as the insulating material, and particularly relates to improvements in the construction and working of a tube where the insulating material is continuously hardened.

DESCRIPTION OF THE PRIOR ART

In the known art, the usual apparatus for the manufacture of polyolefin-covered cables comprised the device of vulcanizing cable insulation composed of a mixture of a hardenable polyolefin and a cross-linking agent extruded over a conductor in saturated steam heated at about 200°C under the pressure of about 15 kg/cm$^2$G, followed by cooling the thus hardened layer by water kept at about 20°C under the same pressure. According to this device, the heated and pressured steam penetrates into the insulating material during the hardening period and, as such penetrating steam is condensed by cooling, it naturally grew into the liquid form which would later turn to volatilize, resulting to form many voids within the vulcanized insulation. The formation of voids is known to have adversely affected the finished cable with respect to the treeing-proof property and the characteristic of aging in water, and such affected cables were not suitable for extra-high-voltage power transmission.

In order to remove the above disadvantage of the older conventional method, there has been proposed a method whereby the insulating material is heat-hardened in a tube either by aid of heated wires together with an inert gas or by a heated inert gas circulating. These methods using no steam as the heating medium have in fact been successful in eliminating the formation of voids during the heat-hardening process, but they have not been able to remove any voids inherent in the pelletized insulating material or prevent the formation of voids due to intrusion of air during the extrusion of the insulating material onto the conductor. Besides, those methods are apt to impair the electric characteristics of finished product due to the presence of water remaining after use as the cooling medium.

OBJECTS OF THE INVENTION

It is therefore the primary object of this invention to provide a continuously insulated cable manufacturing apparatus free of disadvantages and defects of the prior art, which is safe from the occurrence of voids within the insulating material during the course of curing and capable of extinguishing any voids formed due to intrusion of air during the extrusion of the insulating material onto the cable conductor.

SUMMARY OF THE INVENTION

The apparatus according to the present invention comprises a tube partitioned into two sections, i.e., heating and cooling zones. The heating zone of the tube is composed of a heat transfer medium while the cooling zone is composed of a cooling medium. The two zones are separated by way of a certain partition area so that the heat transfer and cooling mediums can be circulated respectively within the heating and cooling zones of the same tube, such circulation being enforced and controlled by a pressure means connected to the two separate zones. A conductor, or a cable core, which has been coated, in turn, with inner and outer conductive materials and a hardenable insulating material, is passed through the tube to have the insulation satisfactorily hardened in accordance with the method of the invention. The cable core having passed the tube is then drawn into a die arranged in alignment which, containing a cooling medium of the same kind as applied to the tube, is designed so that the cooling medium is super-cooled and the thus cooled medium will increase its viscosity, resulting to pressure-seal the clearance between the outer surface of the covered cable core and the wall surface of the passage in the die. The thus-treated cable is then further drawn through a packing provided just after the die to make the surface of the hardened core cable clean of any dirt or oil, and the finished cable is taken up by a winding means. These covering and curing processes are carried out continuously.

BRIEF DESCRIPTION OF THE DRAWINGS

In the accompanying drawings.

DESCRIPTION OF THE INVENTION IN RELATION TO THE DRAWINGS

Now, the present invention will further be illustrated by reference to the drawings.

Figure 1:
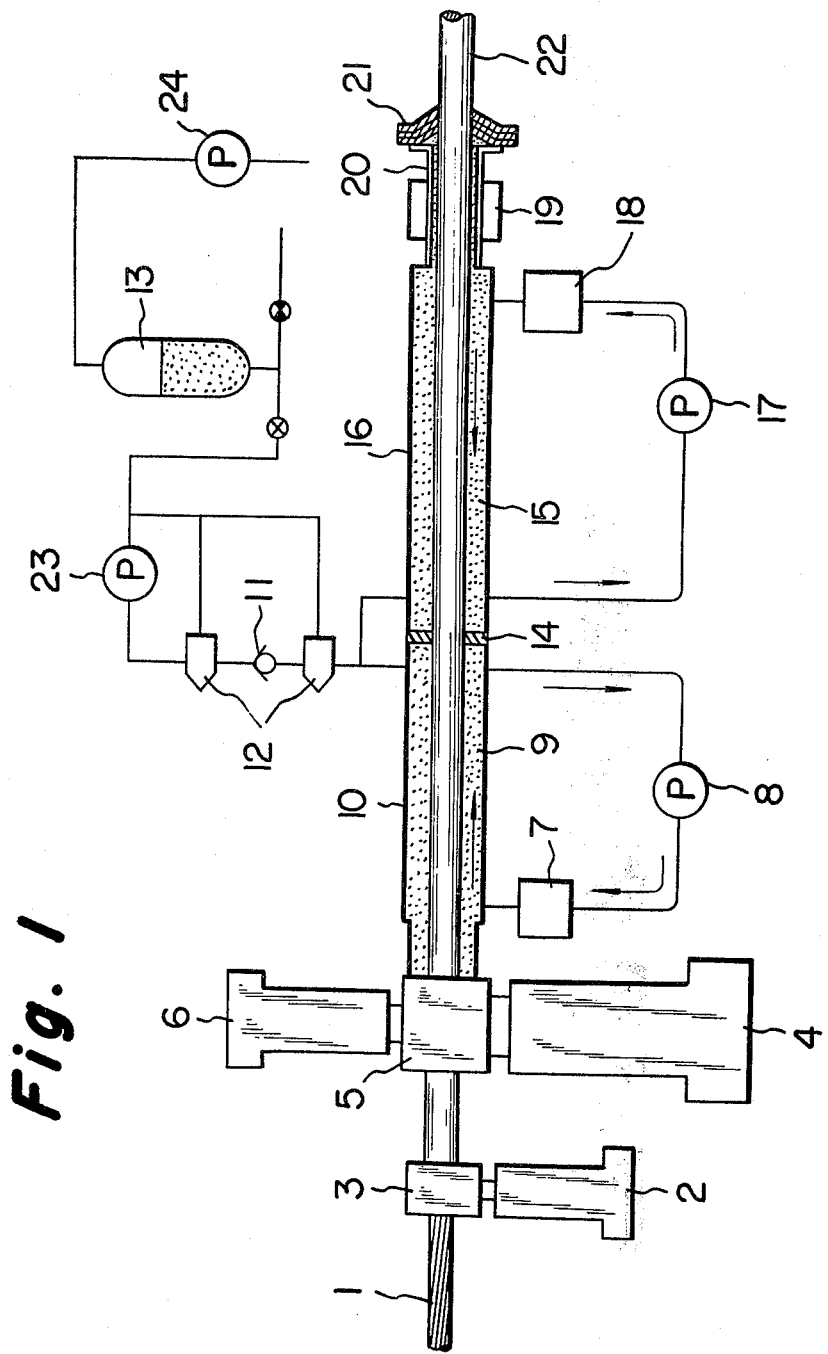
FIG. 1 shows a diagrammatic cross-sectional view of one construction of an apparatus in accordance with the present invention.

Referring to FIG. 1, a bare cable core denoted by numeral 1 is fed into the cross-head 3 of a semi-conductive material extruder 2 to be coated with the extrudate as the inner layer and the coated cable core is sent into the cross-head 5 common to an insulating material extruder 4 and another semi-conductive material extruder 6 to be covered with the hardenable insulating material and thereon with the semiconductive material. The cable core thus covered is continuously passed through the tube, comprising a heating zone 10 filled with a heat transfer medium 9, a cooling zone 16 filled with a cooling medium 15 and an area composed of a seal packing 14 provided to partition the heat transfer medium from the cooling medium.

As the suitable heat transfer or cooling medium according to the present invention is used a completely degased and dried silicone oil which is stable against heat and harmless to polyolefins. In order to promote its working efficiency, the silicone oil is recommended to have a high viscosity, preferably ranging from 5,000 to 100,000 cs. as well as a high heat coefficient.

As the suitble seal packing 14, provided to prevent the heat transfer and cooling mediums from mixing together, is used a substance having good heat resistance and elasticity, for example, a cross-linked and foamed silicone rubber of the same nature as the heat transfer medium.

Heating zone 10 or cooling zone 16, separately and individually, form a heating or cooling medium circulating system by force. Through the heating zone, heating medium 9 having been heated by a heater 7 and introduced thereinto by means of a pump 8 is forced to circulate in the direction of the arrows. On the other hand, cooling medium 15 having been cooled by a cooling device 18 and introduced into the cooling zone by means of a pump 17 is forced to circulate in the direction of the arrows.

Both the curing and cooling zones 10 and 16 are put under pressure in the range of from 5 to 25 kg/cm$^2$G so that the covered core 22 may be prevented from foaming and the silicone oil may fill up any voids existing in the insulating polyolefin in an accelerated manner. Such pressure is supplied to both the curing and cooling zones 10 and 16 controlled automatically by a known pressure regulating device connected thereto comprising a vacuum pump 24, a silicone oil tank 13, a pressure pump 23, a check valve 11, and a set of relief valves 12. It is reasonably required to connect the pressure regulating device to the two zones at points near the center of the length of the tube to render the necessary pressure evenly distirbuted through each zone.

The covered cable core 22 is passed through a die 20 which has been cooled down to a temperature between −20° and −40°C by means of a super-cooling device 19, then through a packing 21, and finally onto a reel (not shown).

The silicone oil treated by the super-cooling device 19 when passed through the die 20 becomes to increase its viscosity thereby to pressure-seal the clearance between the outer surface of covered core 22 and the wall surface of the passage in die 20. Packing 21 works to clean the surface of the passing insulated cable core of any dirt or residues of the silicone oil. Incidentally, it is designed that die 20 is changed for another according to size of the cable core 22 to be passed through so that the passing clearance should be maintained at about 2 to about 5 mm.

Figure 2:
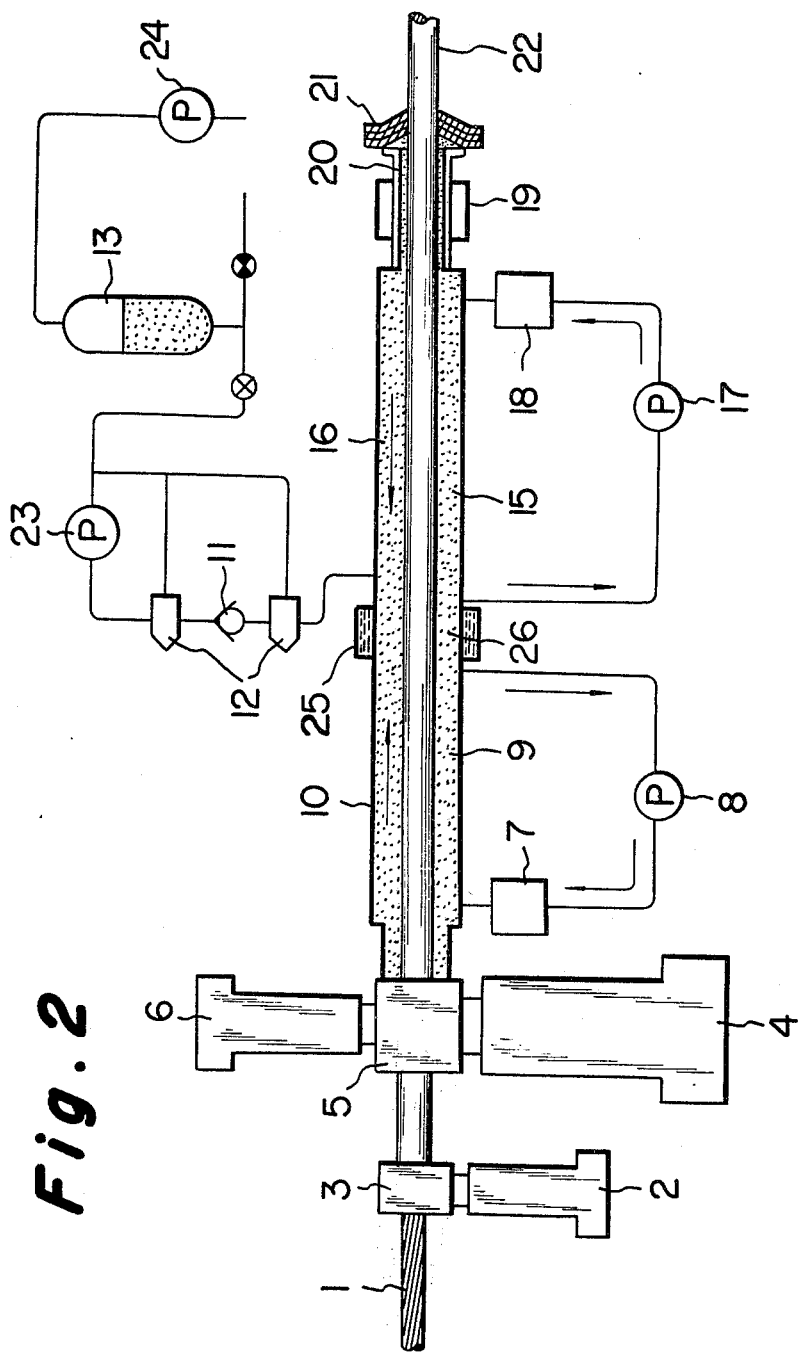
FIG. 2 shows a diagrammatic cross-sectional view of a second construction.

FIG. 2 is a representation of a similar apparatus in which the so-called buffer area is provided between the heating and cooling zones in place of the partition area composed of a seal packing as in the embodiment shown by way of FIG. 1. Referring to FIG. 2, the tube comprising heating zone 10 filled with heat transfer medium 9 and cooling zone 16 filled with cooling medium 15 is provided with the buffer area 26 filled with the same medium whereby to keep the heat transfer and cooling mediums circulating in the heating zone and the cooling zone separately. Surrounding the tube at this buffer area is installed a jacket 25 through which water is passed to cool the heat transfer and cooling media so effectively that the longitudinal length of the buffer area 26 can be as small as from 0.5 to 1 m. Within the buffer area the heat transfer and cooling mediums are in contact to each other, but these two mediums do not become mixed to worsen their heat efficiency. And yet, the provision of the buffer area in liquid state according to the embodiment of FIG. 2 is advantageous over the provision of the partition area composed of solid material according to the embodiment of FIG. 1 as the latter involves the risk of injuring the surface of the passing cable core while the former can preclude such risky possibility.

As in the case of the FIG. 1 embodiment, the FIG. 2 embodiment is free of foaming phenomena on the cable core 22 during the curing and cooling processes and also of any voids remaining unfilled with the silicone oil.

Further, according to the FIG. 2 embodiment in which the buffer area is provided, the pressure regulating device for the supply of silicone oil is connected to the tube at only one point since there is no boundary or partition between the heating and cooling zones.

In summation, the apparatus of the present invention may be featured by the following.

1. Since the heating and cooling zones in the tube are separated from each other, the heat transfer and cooling mediums contained therein are prevented from mixing together and their heat efficiency can be improved.

2. Since the heat transfer and cooling mediums are independently circulated within their own respective zones, their heat conductivity can be improved.

3. Since pumping means for circulating the heat transfer and cooling mediums are installed and worked separately from the pump for sending silicone oil into the tube under pressure, the pressure regulation can be performed with ease.

4. Since a completely degased and dried silicone oil is used as the heat transfer or cooling medium, there can be avoided the formation of voids in the insulating material or, even though a secondary formation of voids takes place, it can be vanished by filling those voids with the silicone oil, thus resulting in improvements in the treeing-proof property and the characteristic of aging in water of the finished product.

5. The pressure-sealing of the clearance between the passage walls in the die and the passing core surface is carried out with the silicone oil medium super-cooled and solidified.

6. Since silicone oil as the heat transfer medium has approximately the same specific gravity as the apparent specific gravity of polyolefin as the insulating material, the soft hardenable polyolefin applied on the conductor is supported by the silicone oil as it is drawn through the heating zone to prevent distortion of its shape before it is fixed by vulcanization. Further, due to the buoyancy of the silicone oil to the conductor, the insulated cable core need not be kept at an extraordinarily high tension.

What is claimed is:

1. An apparatus for manufacturing electric conducting cables insulated with a hardened polyolefin which comprises a tube partitioned into a heating zone filled with a heat transfer medium and a cooling zone filled with a cooling medium, separate circulation systems for said heat transfer and cooling media, a pressure regulating means connected to each of said circulation systems, and a die arranged in alignment just after the outlet of said tube and filled with the same cooling medium as in said cooling zone of said tube, and a super-cooling means connected to said die to supercool said cooling medium therein so that the supercooled medium works to seal the clearance between the outer surface of a passing insulated cable core and the inner wall surface of the passage in said die.

2. The apparatus according to claim 1 wherein said heating and cooling zones are partitioned by means of a seal packing.

3. The apparatus according to claim 1 wherein said heating and cooling zones are partitioned by a buffer area within which said heat transfer and cooling media are in contact with each other and surrounding which a water jacket is provided.

4. The apparatus according to claim 1 wherein said cooling medium in said die is super-cooled to a temperature of from −20° to −40°C.

* * * * *